March 13, 1945.　　　　C. A. MARTIN　　　　2,371,401
PORTABLE SAWING MACHINE
Filed Dec. 13, 1941　　　　2 Sheets-Sheet 1
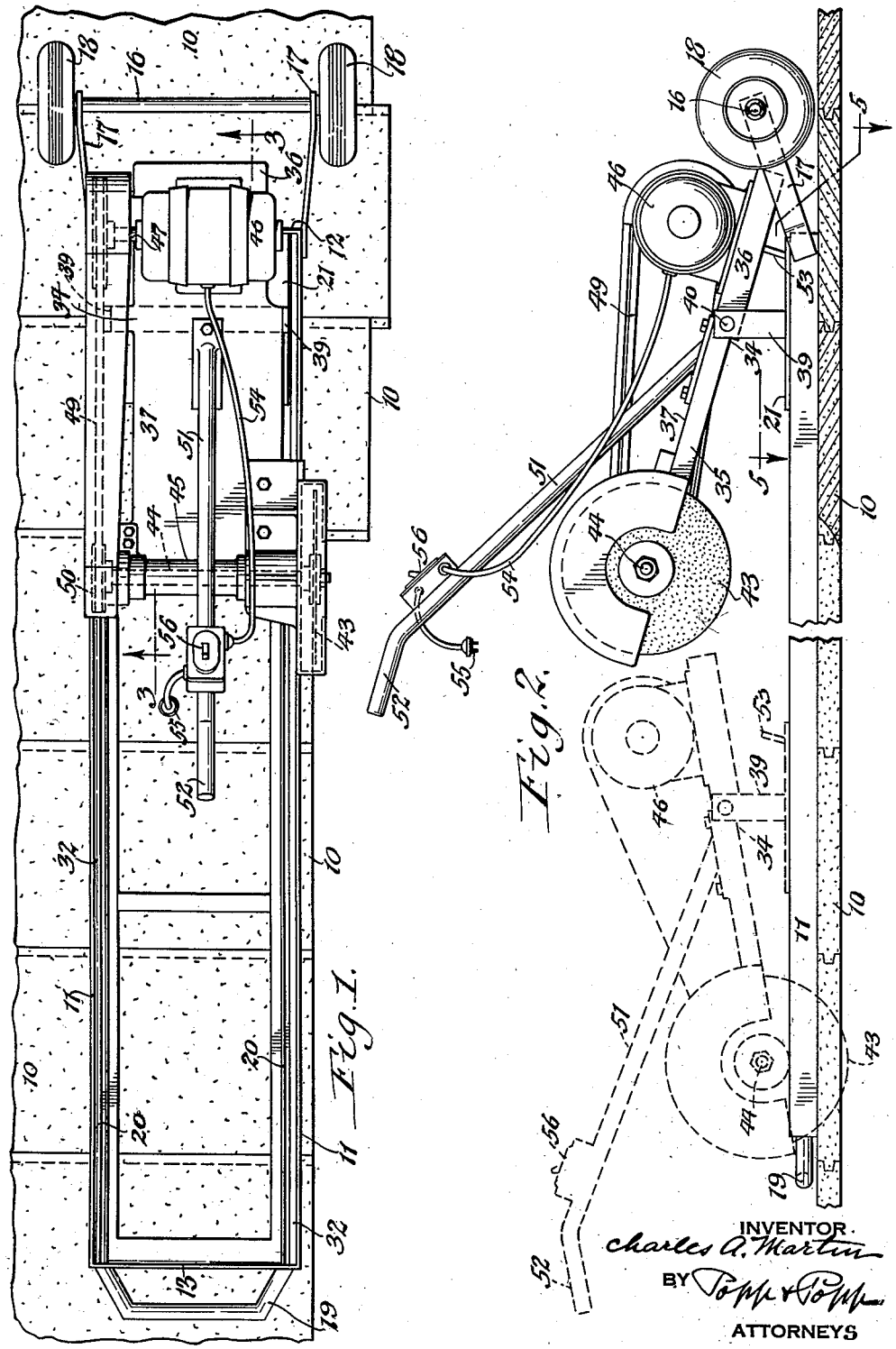
INVENTOR
Charles A. Martin
BY Pope & Pope
ATTORNEYS

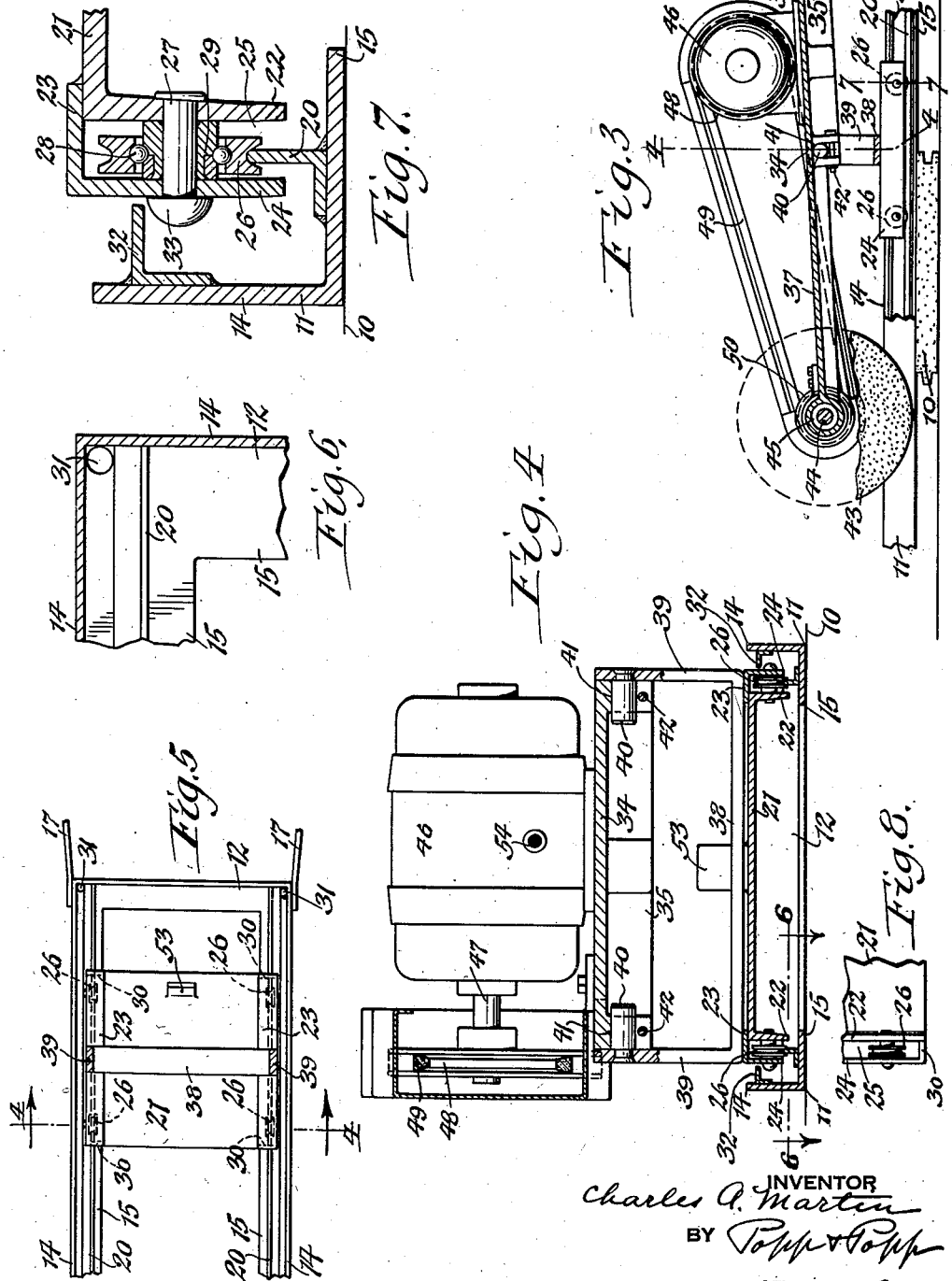

Patented Mar. 13, 1945

2,371,401

UNITED STATES PATENT OFFICE 2,371,401

PORTABLE SAWING MACHINE

Charles A. Martin, Buffalo, N. Y.

Application December 13, 1941, Serial No. 422,895

1 Claim. (Cl. 51—170)

This invention relates to a portable sawing apparatus which is more particularly intended for cutting concrete planks, slabs or the like in building structures but the same may also be advantageously employed for other purposes.

Portable sawing machines of this character as heretofore constructed were incapable of accurately and uniformly cutting concrete planks and the like, inasmuch as the guiding and controlling of the apparatus depended wholly upon the skill and care of the operator using the same and this therefore required great care on the part of the operator as well as loss of time and also was liable to result in imperfect or irregular work.

It is the object of this invention to provide a portable sawing apparatus whereby concrete planks, slabs and the like may be quickly cut after being installed in the building or before such installation and to accurately guide the saw of the apparatus relative to the work without depending on the skill of the workman and thus insure perfect work at low cost.

In the accompanying drawings:

Fig. 1 is a top plan view of the sawing apparatus embodying the preferred form of this invention.

Fig. 2 is a side elevation of the same.

Fig. 3 is a vertical longitudinal section, taken on line 3—3, Fig. 1.

Fig. 4 is a vertical transverse section, on an enlarged scale, taken on line 4—4, Figs. 3 and 5.

Fig. 5 is a fragmentary horizontal section, taken on line 5—5, Fig. 2.

Fig. 6 is a fragmentary horizontal section, on an enlarged scale, taken on line 6—6, Fig. 4.

Fig. 7 is a fragmentary vertical section, on an enlarged scale, taken on line 7—7, Fig. 3.

Fig. 8 is a fragmentary bottom plan view of the carriage which supports movable parts of the apparatus.

In the following description similar characters of reference indicate like parts in the several figures of the drawings:

In its general construction this sawing apparatus comprises a saw for cutting the planks or like material of a building, a motor for driving the saw, a vertically rocking operating lever or beam which supports the saw and motor and whereby the saw is moved vertically toward and from the work, a horizontally movable carriage upon which said beam is mounted and whereby the saw is moved horizontally relative to the work to be cut, and a guide frame or base which is adapted to rest on the work and whereby said carriage is guided in its horizontal movement relative to the work.

In Figs. 1, 2 and 3 of the drawings this apparatus is shown in position for transversely cutting a plurality of concrete planks or slabs 10 which have been assembled so that the same engage one another at their longitudinal edges for producing the floor or roof of a building but if desired the same may be employed for cutting individual planks before they are installed in a building.

The guiding frame or base of the apparatus preferably includes two parallel longitudinal side bars 11 and two parallel transverse end bars 12, 13, connecting the front and rear ends of the longitudinal bars. Each of these bars is preferably constructed of angle iron and has an outer vertical flange 14 and an inwardly projecting lower flange 15 adapted to rest on the plank or planks during the operation of cutting the same, as shown in Figs. 1, 2 and 3, or to rest on some other support when not in use. For convenience in transporting the guiding frame from one place to another and particularly for shifting the same on and off of the work which is being cut, a rolling support is provided which may consist of an axle 16 arranged transversely in front of the guiding frame and connected adjacent its ends by arms 17 with the rear end of said frame, and a pair of trundle wheels, casters or rollers 18 mounted on the ends of said axle and adapted to run over the ground, the building floor or the planks of the building roof or floor which are being cut.

The arms 17 are preferably inclined upwardly and rearwardly so that when the guiding frame rests on the planks or other surface the trundle wheels will be lifted out of contact with the floor or planks, as shown by full lines in Fig. 2, and thus permit the frame of the apparatus and the parts mounted thereon to be retained in place by their weight and not liable to easy displacement, but when the apparatus is to be shifted the frame is raised at its rear end sufficient to lower the trundle wheels into engagement with the planks or floor and thus permit the apparatus as a whole to be easily shifted about. For conveniently raising and lowering the rear end of the frame and also trundling the same from place to place the rear end of the frame is provided with a handle 19 which is arranged below the upper side of the frame so as not to interfere with the movement of the parts arranged above the frame.

The carriage which supports the working parts of the apparatus and the means for guiding the same on the frame are constructed as follows:

The numeral 20 represents two longitudinal rails of a track arranged lengthwise on the upper side of the horizontal flanges 15 of the frame side bars, which rails are preferably made of angle iron and welded to the horizontal flanges of the respective frame bars.

The carriage includes a horizontal body or top plate 21 which is arranged between the side bars 11 and two longitudinal flanges 22 projecting downwardly from opposite longitudinal edges of the plate 21 along the inner side of the tracks or rails 20. Adjacent to each longitudinal edge of the carriage plate 21 is arranged an angle iron which has a horizontal upper flange 23 which is secured to the respective edge of the carriage plate 21 by welding, or otherwise, and a vertical outer flange 24 projecting downwardly along the outer side of the adjacent guide rail 20. Within each of the downwardly opening grooves or channels 25 formed between the companion flanges 22 and 24 at one side of the carriage rolling means are arranged whereby the carriage rides on the adjacent guide rail 20 which rolling means preferably consist of two wheels or rollers 26 arranged in the front and rear parts of the respective channel and journaled on the adjacent flanges 22, 24 and each wheel provided with a peripheral groove which engages with the respective rail or track 20, as shown in Figs. 4 and 7.

In order to cause the wheels 26 to run easily and with a minimum amount of friction, each of these wheels is mounted on the carriage by means of a ball bearing which comprises a bearing pin 27 extending across the respective channel 25 and supported at its ends on the adjacent flanges 22, 24, and an annular row of bearing balls 28 arranged between the bore of the wheel and the periphery of a split sleeve 29 on the central part of the bearing pin 27, as shown in Fig. 7.

Inasmuch as considerable dust is produced during the operation of sawing concrete planks and the like with this apparatus, access of this dust to the means whereby the carriage wheels are journaled on the carriage is rendered difficult by extending the lower edges of the flange 22, 24 downwardly below the upper edges of the rails 20, thereby directing the dust away from these rails 20 and the bearings of the wheels 26 and avoiding undue wear and clogging of the same. Entrance of dust into the ends of the channels 25 is also further retarded by providing the opposite ends of each flange 24 with inwardly turned lips 30, thereby closing these ends, as shown by dotted lines in Fig. 5, and by full lines in Fig. 8 and reducing, if not wholly eliminating such dust from the bearings of these wheels. Any dust which may fall on the lower flanges 15 of the frame between the vertical flanges 14 of the same and the rails is permitted to escape therefrom through discharge openings arranged in opposite ends of the flanges 15, as shown at 31 in Figs. 5 and 6.

Lifting of the carriage from the frame and disengagement of its wheels 26 from the guide rails 20 is prevented by stop bars 32 and having preferably the form of angle irons which are secured lengthwise by welding or otherwise to the inner sides of the flanges 14 so as to overhang the enlarged heads 33 at the outer ends of the bearing pins 27, as shown in Fig. 7, and thereby not only permitting the carriage to move horizontally freely and preventing lifting of the same, but also further guarding against an excessive amount of dust reaching the bearings of the carriage wheels.

The movable beam which supports the saw and its operating mechanism is constructed and mounted on the carriage so as to swing or rock vertically as follows:

The numeral 34 represents a horizontal longitudinal plate which forms the body of the rocking operating lever or beam and 35 strengthening flanges projecting downwardly from the edges of the same. This rocking lever is pivoted between its front and rear arms 36, 37 on the carriage so that one arm moves upwardly while the other moves downwardly. The pivotal connection between the rock lever and the carriage is preferably so constructed that the lever can be readily attached to and removed from the carriage for convenience of inspection and servicing and for this purpose the pivotal mounting is constructed as follows:

The numeral 38 represents the lower horizontal bar of a bracket which is arranged transversely on the upper side of the body of the carriage and provided at its opposite ends with two upwardly projecting standards or posts 39 each of which carries an inwardly projecting pivot pin 40 at its upper end. The rocking lever is arranged between the posts 39 and on opposite edges of the underside of the rocking lever between its arms the same is provided with two downwardly opening saddle bearing seats 41 each of which receives one of the pivot pins and rests on the upper side thereof. Each of these pivot pins is removably confined in its respective bearing seat by a retaining pin 42 connecting the opposite sides of the respective bearing seat below the pivot pin which turns therein, as shown in Figs. 3 and 4. By removing the retaining pins 42 the rock lever and the parts mounted thereon can be readily lifted from the carriage.

The numeral 43 represents the cutter whereby the planks or other material is severed and which preferably consists of a rotary disk or blade made of abrasive material, such as silicon carbide or carborundum. This rotary blade is mounted on the operating lever so as to turn about a horizontal transverse axis and this is preferably effected by means of a cutter shaft 44 journaled horizontally and transversely in a bearing 45 on the rear arm 37 of the operating lever and having the cutter blade secured to one end thereof so that this blade is arranged on one side of the operating lever and projects downwardly therefrom, as shown in Figs. 1 and 2. The power for driving the rotary cutter blade is derived from a prime mover which preferably consists of an electric motor 46 mounted on the front arm of the operating lever and provided at one end of its driving shaft 47 with a driving pulley 48 from which motion is transmitted by a belt 49 to a driven pulley 50 on the corresponding end of the cutter shaft, as shown in Figs. 1, 2, 3 and 4.

The weight of the parts mounted on the operating lever are so distributed that the weight of the motor on the front arm of the lever will be depressed while its rear arm carrying the cutter blade will be elevated, as shown by full lines in Fig. 2. This is accomplished by utilizing a motor and associated parts which are heavier than the cutter blade and associated parts.

For the purpose of turning the operating lever manually and lowering the cutter blade into an operative position relative to the work a handle bar 51 is provided which is arranged in an inclined position over the operating lever and connected at its lower front end with the top of the arm of the operating lever while its rear elevated end is provided with a grip or handle 52 for manipulating the same.

Stop means are provided for the purpose of limiting the rocking movement of the operating lever in the direction for raising the cutter blade into an inoperative position but preventing the front arm of the lever from descending to a place in which the same would interfere with the free movement of the carriage relative to the guide frame, which stop means preferably consist of an upwardly projecting stop lug 53 arranged on the front part of the carriage body and adapted to be engaged by the underside of the front arm of the operating lever.

In using this apparatus the same is trundled to the desired location by taking hold of the handle 19 on the frame and tilting the latter so that the load is carried solely by the trundling wheels 18 and thus make it easy to transport the apparatus from one place to another. When the apparatus reaches the desired place the frame is lowered into a horizontal position in which the trundling wheels are above the plane of the underside of the frame which enables the latter to rest by gravity on the article to be cut such for example as the planks of a roof shown in Figs. 1, 2 and 3, the weight of the apparatus being sufficient to hold it in place without any separate fastening means. While thus transporting the sawing apparatus the carriage and the parts mounted thereon are moved to the front of the frame and held there by gravity, the forward movement of the carriage being limited by engagement of its front end with the front cross bar 12 which latter acts as a stop for this purpose. The frame is now adjusted on the plank or planks to be cut so that tracks or rails of the same are parallel with the kerf or cut which is to be produced on the planks or the like and the rotary cutter blade is arranged above and vertically in line with the plane of the proposed cut.

The operating lever is now turned by means of its handle bar so as to lower the cutting blade while the latter is in motion and cause the latter to cut its way downwardly through the adjacent roof plank, as shown by dotted lines at the left of Fig. 2. While the saw is in this lowered position the operator moves the carriage lengthwise on the track or rails of the frame which is now stationary thereby cutting crosswise one or more of the planks upon which the frame rests. The rearward movement of the carriage on the base or frame is limited by engagement of the rear end of the carriage with the rear cross bar 13 of the frame which acts as a stop for this purpose. When this cut has been effected the desired distance the blade is again raised into an inoperative position by releasing the downward pressure on the handle and permitting the weight of the motor 46 to turn the operating lever in the direction for lifting the saw 43.

Cutting of the planks in this manner may be effected in any part of the roof, floor or other like part of the building and is particularly useful for cutting off the eave portion of roof planks after the same have been laid, as shown in Fig. 1, in order to produce an even or straight edge on the same.

Electric current for operating the motor 46 is supplied thereto by a feed line 54 which latter is provided with a coupling 55 for connecting the same with a main source of electric current and also with a switch 56 for controlling the supply of current to the motor this switch being preferably mounted on the handle 51, as shown in Figs. 1 and 2, where it is conveniently accessible to the operator.

As a whole this sawing apparatus is very simple and compact in construction, the same is very strong and durable, it can be readily transported and the same can be operated easily and quickly and enables work of this character to be done efficiently and economically.

Although the cutter blade has been described as made of an abrasive material, it is to be understood that the cutter blade may be made of other suitable material, such as steel.

It is to be noted that in the preferred construction the cutter blade is adapted to move vertically toward and from the surface to be cut on one side of the base or frame, inasmuch as such an organization enables the operator to clearly observe the work of the cutter on the part which is being cut, but it is to be understood that this apparatus can be varied in its construction and still accomplish this purpose.

It is, of course, obvious that this sawing apparatus can be used effectively by supporting the same over the article or surface to be sawed instead of actually resting on said article or surface as, for example, when cutting or trimming a stationary part of the roof or floor of a building.

Instead of using an electric motor, as shown in Figs. 1, 2, 3 and 4, any other suitable form of motor may be employed, such as a gas engine.

This sawing apparatus is particularly valuable for producing straight and uniform cuts on even or uneven surfaces or parts which have already been installed or are too cumbersome and which therefore cannot be carried to some place to be sawed inasmuch as this sawing apparatus can be easily transported to an immovable part or surface for cutting the latter uniformly, accurately and expeditiously.

I claim as my invention:

A sawing apparatus comprising a frame, horizontal guide rails mounted within said frame, a carriage having a body arranged within said frame and downwardly projecting flanges arranged on opposite sides of said rails and forming downwardly opening channels, wheels arranged within said channels and mounted on said flanges and engaging with said rails, pivot pins whereby said wheels are journaled on said flanges and which are provided at their outer ends with heads, stop bars arranged horizontally on said frame and adapted to be engaged by said heads for preventing lifting of said frame and disengagement of said wheels from said rails, and a cutting device mounted on said carriage and movable toward and from the article to be cut.

CHARLES A. MARTIN.